INVENTORS
HABIB S. RAHME
LYNN E. ELLISON
BY Edward H. Lang
ATTORNEY.

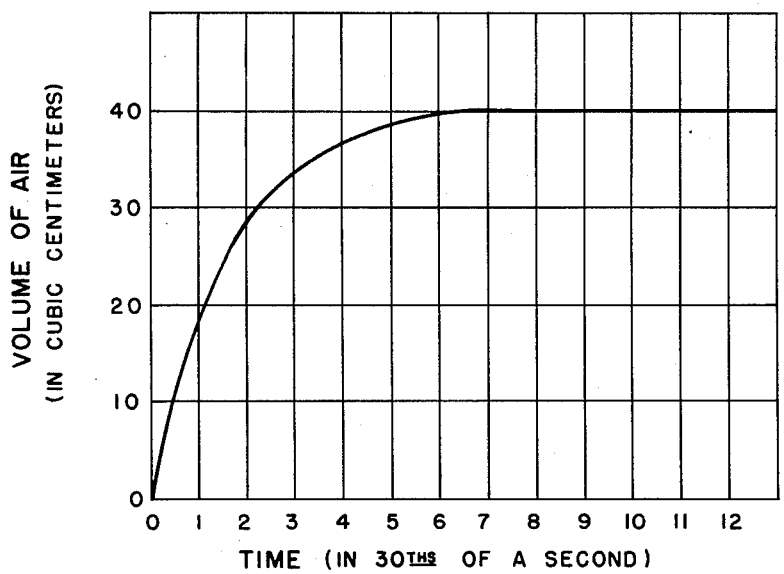
FIG. 4
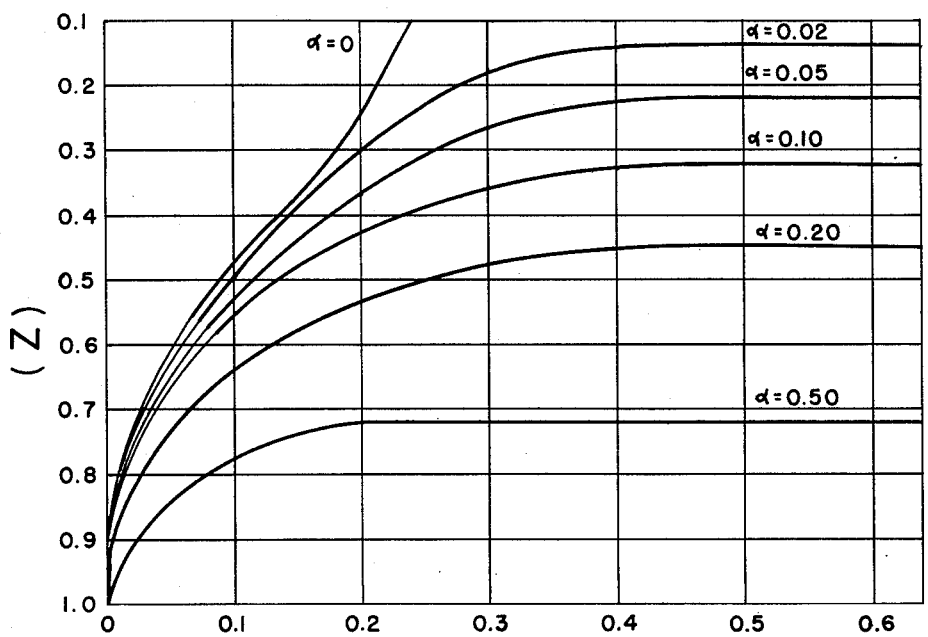
FIG. 5 $\quad \int_{Z}^{1.0} \frac{Z^3 \ln(\frac{1}{Z}) dZ}{Z^2 - \alpha}$
INVENTORS
HABIB S. RAHME
LYNN E. ELLISON
ATTORNEY.

United States Patent Office 3,140,599
Patented July 14, 1964

3,140,599
METHOD AND APPARATUS FOR DETERMINING
PERMEABILITY OF EARTH FORMATIONS
Habib S. Rahme and Lynn E. Ellison, Crystal Lake, Ill.,
assignors to The Pure Oil Company, Chicago, Ill., a
corporation of Ohio
Filed Dec. 7, 1961, Ser. No. 157,707
9 Claims. (Cl. 73—38)

This invention relates to the measurement of flow characteristics in porous specimens and, more particularly, to an apparatus and method for measuring the permeability of porous-earth formations utilizing a test fluid maintained at a substantially constant pressure.

It is desirable to have knowledge of flow characteristics in earth strata to solve well-production problems concerning secondary recovery, pressure maintenance, and proper evaluation of recoverable reserves. This information is obtained by determining the permeabilities of core samples obtained from the formations. It is essential that the permeability measurements of the core samples accurately reflect the actual flow conditions within the earth strata, to be of value. The cores obtained by the usual methods utilized in coring are cylindrical with the long axis perpendicular to the direction of flow in the earth strata.

Heretofore, the methods of measuring the permeabilities of cores to fluids did not accurately reflect the actual flow conditions within the earth strata. The prior art method of determining the permeability of a core by flowing a test fluid axially through the core, that is, in a direction perpendicular to the direction of flow in the formation, is unsatisfactory since the formations from which the cores are obtained are frequently heterogeneous. In addition, the flow is not in a radial direction, as is the direction of flow into or from a well bore. Another prior art technique of evaluating the permeability is to cut from the core a cylindrical specimen having an axis perpendicular to that of the core and flow the test fluid axially through the cylindrical specimen. This method is also unsatisfactory since the effective volume of the specimen is significantly reduced, and while the flow through the specimen is in the same direction as within the earth strata, it still is not in a radial direction.

This invention is directed to an apparatus and method for determining the permeabilities of cylindrical porous specimens. In our invention, the permeability of a large core, as obtained from the formation, is determined by causing a test fluid under substantially constant pressure to enter the core radially and measuring the rate of entry. Since the test is conducted under radial flow in a large core in the same direction as in the reservoir, more accurate permeability determinations are obtained than by the utilization of prior art techniques.

Briefly, the apparatus of this invention comprises a fluid-tight core holder adapted to hold a core in such a manner as to permit radial entry of fluid into the core. The core holder is connected by a valve-controlled line to a chamber that is separated from a second chamber by a movable diaphragm. Separate valve-controlled lines for admitting fluid under pressure are connected to both chambers. Connected to the movable diaphragm is a device for measuring changes in its position relative to time, the device being interpreted in terms of the volume of fluid which has entered the core at any time. It will be evident that such an apparatus maintains the test fluid at a substantially constant pressure during the test run.

It is an object of this invention to provide an apparatus and method for measuring the flow characteristics of a porous specimen.

Another object of this invention is to provide an apparatus and method for measuring the permeability of a full-diameter core as originally obtained from a subterranean formation.

Another object of this invention is to provide an apparatus and method for determining the permeability of a core under conditions which accurately reflect the actual flow conditions within the earth strata.

Another object of this invention is to provide an apparatus and method for measuring the permeability of a core by measuring the volume of a fluid under substantially constant pressure which has radially entered the core as a function of time.

These and further objects of this invention will become apparent as the description proceeds.

The invention is best described with reference to the drawings in which:

FIGURE 4 is a graph depicting the volume of test-fluid influx into a core as a function of time; and FIGURE 5 is a graph which may be used to avoid time-consuming calculations in determining the permeability of a core.

Figure 3:
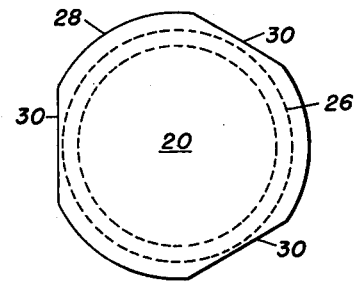
FIGURE 3 is a top view of the coreholder cover.
Figure 3:
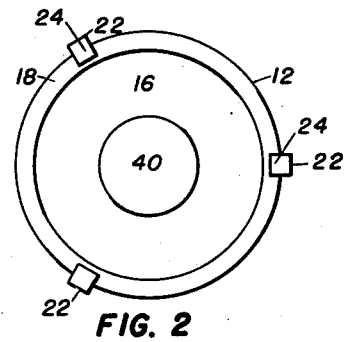
Figure 2:
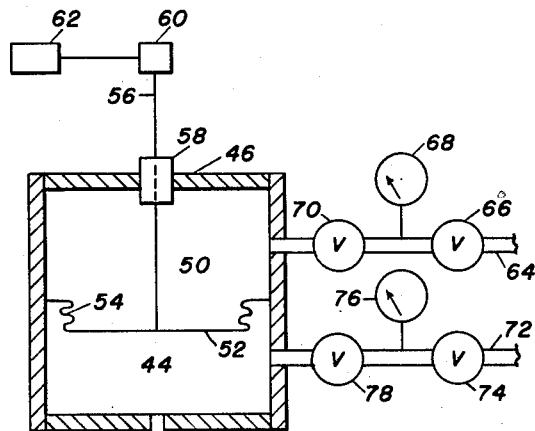
FIGURE 2 is a top plan view of the coreholder, uncovered.
Figure 1:
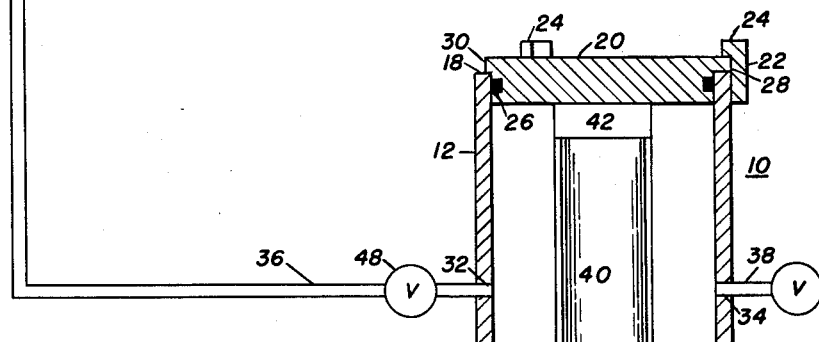
FIGURE 1 is a diagrammatic view, partially in section, of the apparatus of this invention.

Referring to the drawings, the numeral 10 designates a core holder which is a cup-shaped receptacle with cylindrical side-walls 12, and bottom 14 forming core-sample chamber 16. The top of cylindrical side-wall 12 forms a shoulder 18 on which cover 20 is supported. Affixed to the outside of cylindrical side-wall 12 is a plurality of inverted L-shaped members 22 with the horizontal portions thereof forming cover-engaging members 24. Cover-engaging members 24 extend above and are spaced from shoulder 18. The bottom edges of cover-engaging members 24 are sloped in the same direction around cylindrical side-wall 12. The lower portion of cover 20, which has a diameter slightly less than the inner diameter of cylindrical side-wall 12 so it can be inserted therein, is provided with groove 26 around the periphery thereof in which a ring-like sealing member of a resilient material such as rubber is disposed. Cover 20 is provided with lip 28 which rests on shoulder 18. Lip 28 has flats 30 cut into the edges thereof so that it can pass cover-engaging members 24 and rest on shoulder 18. The height of lip 28 is less than the greatest distance between shoulder 18 and the sloped bottoms of cover-engaging members 24, but is greater than the smallest distance between the two. It is evident that as cover 20 is turned, the sloped bottom edges of cover-engaging members 24 will press against lip 28 to seal same against shoulder 18. A handle can be provided on the top of cover 20 in order that it can be easily turned. Cylindrical side-wall 12 is provided with sideports or openings 32 and 34 leading to chamber 16. Openings 32 and 34 are preferably internally threaded to provide means for attaching valve-controlled conduits 36 and 38.

Disposed within chamber 16 is core 40 of which the permeability is to be determined. Should the height of core 40 be less than the distance between bottom 14 and cover 20, flat filler discs 42 can be provided adjacent to the upper and lower flat ends of core 40 to hold same in place without interfering with the radial entry of fluid into it. Filler discs 42 are preferably of a resilient material which is impervious to the test fluid to be used to prevent the entry of the test fluid into the flat ends of core 40.

Test fluid is supplied to core-sample chamber 16 by conduit 36 which communicates with fluid chamber 44 of vessel 46. The flow of the test fluid in conduit 36 is controlled by valve 48. Fluid chamber 44 is separated from pressure chamber 50 by movable, fluid-tight diaphragm 52. Diaphragm 52 is a substantially rigid member against which the opposing forces of the contents of fluid chamber 44 and pressure chamber 50 act. Secured in fluid-tight relationship to the inside wall of vessel 46 and diaphragm 52 is flexible member 54 so that diaphragm 52 can be extended or contracted vertically as the pressures in fluid chamber 44 and pressure chamber 50 change. Flexible member 54 can take the form of a bellows. Secured to diaphragm 52 is rod-like member 56 which extends out of vessel 46 through fluid-tight packing 58. Connected to rod-like member 56 is sensing device 60 which creates a mechanical or electrical output in proportion to the movement of rod-like member 56, responsive to the movement of diaphragm 52. Sensing device 60 can take the form of a transducer, potentiometer, gears, and the like. The output of sensing device 60 is connected to recorder 62 which is calibrated in terms of volume of fluid which has entered core 40 versus time. Pressure chamber 50 is connected to a source of pressurized air, water, or other fluid by line 64 which contains pressure-regulating valve 66, pressure gauge 68, and shut-off valve 70. Fluid chamber 44 is connected to a source of pressurized test fluid by conduit 72 which contains pressure-regulating valve 74, pressure gauge 76, and shut-off valve 78. It is evident that only one source of pressurized fluid need be provided if the test fluid is utilized in pressure chamber 50 as well as in fluid chamber 44. Should the test fluid be used in both chambers of vessel 46, the source of pressurized fluid for pressure chamber 50 can be eliminated by connecting conduit 64 to conduit 72 at a point between the source of pressurized fluid and pressure-regulating valve 74.

To illustrate the utilization of the instant apparatus in its application, the flat ends of a full-diameter core, as obtained from a subterranean formation, are coated with a material which is impervious to the test fluid to prevent entry of same through these surfaces. Should there be occluded fluids within the porous structure of the core specimen, these can be removed by flushing the core specimen with a solvent, such as acetone, and then evacuating the core to remove the solvent. The specimen is then placed in core-sample chamber 16 between filler discs 42. Next, cover 20 is put into position with lip 28 resting on shoulder 18. Cover 20 is then rotated so that the bottoms of cover-engaging members 24 press lip 28 against shoulder 18, and so that the sealing member disposed in groove 26 cooperates with the inner wall of cylindrical side-wall 12 to prevent leakage of fluid. If desired, core-sample chamber 16 can be evacuated prior to the start of the test by a vacuum pump connected to valve-controlled conduit 38. The evacuation of core-sample chamber 16 is not essential if air is used as the test fluid. It is evident that valve 48 must be closed prior to the evacuation of core-sample chamber 16 and the pressurization of fluid chamber 44 and pressure chamber 50. After valve 48 is closed, pressure-regulating valves 66 and 74 are set to control at the same pressure, and valves 70 and 78 are opened to admit air and the test fluid to pressure chamber 50 and fluid chamber 44, respectively. It will be evident that at the start of the test, diaphragm 52 must be in such a position that it will be able to move while the test fluid is flowing from fluid chamber 44. This can be facilitated by adjusting pressure-regulating valves 66 and 74 so that the initial pressure in fluid chamber 44 is slightly greater, about 0.5 p.s.i., than the pressure in pressure chamber 50 in lieu of having equal pressures in the two chambers. This slight difference in pressure forces diaphragm 52 to the upmost limit of its travel. The pressures in fluid chamber 44 need be only a few pounds per square inch greater than the initial pressure in the core. With the pressures in fluid chamber 44 and pressure chamber 50 established, recorder 62 is adjusted to zero. Then valves 70 and 78 are closed, and valve 48 is opened and recorder 62 turned on simultaneously. The opening of valve 48 permits the test fluid to flow from fluid chamber 44 through conduit 36 to core-sample chamber 16 where it radially enters core 40. As the flow of the test fluid continues, an unbalanced pressure is created on diaphragm 52, causing it to move downward. The movement of diaphragm 52 actuates sensing device 60, which, in turn, causes recorder 62 to record a graphical record of diaphragm movement calibrated in terms of volume of test fluid which has entered the core, versus time. A representative graph of the volume of a test fluid, air, entering a core sample versus time obtained by the utilization of the apparatus of this invention is shown in FIGURE 4.

Since the volume of test fluid which has radially entered the core specimen at any time is dependent upon the permeability of the specimen, the permeability can be calculated by the following equation, using data obtained from the recorder chart:

$$k = \frac{a^2 \mu \phi}{Put} \int_Z^{1.0} \frac{Z^3 \ln \frac{1}{Z} dz}{Z^2 - \alpha}$$

where:

$$Z = \sqrt{1 - (1-\alpha)Vt/VT}$$

and: $\alpha = Po/Pu$ where:

$k$ is the permeability of the sample in darcies,
$a$ is the radius of the sample in centimeters,
$\mu$ is the viscosity of the fluid in centipoises,
$\phi$ is the porosity fraction of the core,
$Pu$ is the applied fluid pressure in atmospheres,
$Po$ is the initial pressure in the core in atmospheres,
$t$ is the time in seconds,
$Z$ is the ratio of the radius of the uninvaded part of the core to the total radius of the core,
$Vt$ is the volume of fluid that has entered the core at time $t$, and
$VT$ is the maximum volume of fluid that can enter the core at pressure $Pu$.

Since the evaluation of the above integral involves time-consuming calculations, a graph showing different values of the integral can be used in connection with the apparatus of this invention. A graph in which the integral has been evaluated for numerous values of $\alpha$ and $Z$ is shown in FIGURE 5.

Although the invention has been described in relation to a specific embodiment, the apparatus may be modified without departing from the scope of the invention. For example, core holders other than that which is illustrated and described may be used. However, a core holder of the type illustrated and described permits a rapid changing of core specimens in a plurality of tests, and would not detract from the rapid permeability determinations which can be made by the utilization of the apparatus of this invention, as shown in FIGURE 4. It is evident that the relative positions of the fluid and pressure chambers can be altered without departing from this invention. The fluid chamber of the two chambers can be horizontally displaced. Various test fluids, either gaseous or liquid, may be used in the apparatus, including air, gaseous hydrocarbons, water, liquid hydrocarbons, crude oils and the like.

The embodiments of the invention in which an exclusive property or privilege is claimed are as follows:

1. An apparatus for determining the permeability of a cylindrical specimen comprising, in combination, a container having fixed, rigid walls and a fluid-tight removable lid, means cooperating with said fixed container walls and lid for engaging and sealing the flat ends of a cylindrical specimen, whereby said specimen is automatically supported within said container in a fixed position with the flat ends of said specimen sealed when said lid is secured to said container, valve-controlled conduit means connecting said container with a first chamber having fluid-tight walls, a second chamber having fluid-tight walls and a movable common dividing wall with said first chamber, whereby the volume of said second chamber is increased as the volume of said first chamber is decreased, valve-controlled conduit means for admitting fluid to each of said chambers, said first-named conduit means being adapted to be open when said second-named conduit means is closed, and means for measuring the volume of said first chamber.

2. An apparatus according to claim 1 in which said means for measuring the volume of said first chamber is actuated by the movement of said movable wall and records the volume of said first chamber relative to time.

3. An apparatus according to claim 2 in which a second valve-controlled conduit means is connected to said specimen holder.

4. An apparatus according to claim 3 in which said specimen holder includes a round opening adapted to receive said specimen, said round opening being formed with a shoulder, a plurality of cover-engaging members affixed to the walls of said specimen holder, said cover-engaging members having sloped bottom edges and extending above said shoulder, and a cover member, said cover member having a lower portion adapted to be inserted in said round opening and a lip having flats cut out of the peripheral edge thereof, said lip adapted to be pressed against said shoulder by the bottom edges of said cover-engaging members when said cover member is turned.

5. An apparatus according to claim 4 in which said specimen holder has cylindrical side-walls and the top of said cylindrical side walls forms said shoulder.

6. An apparatus according to claim 4 in which said cover-engaging members are the horizontal legs of a plurality of inverted L-shaped members affixed to said side-walls.

7. A method of determining the permeability of a cylindrical specimen to planar, radial flow comprising placing a cylindrical specimen of uninterrupted exterior surface in a closed zone, separating a body of test fluid by a fluid-tight movable barrier from a closed body of a fluid at a pressure in excess of the initial pressure within said closed zone and at least as great as the pressure of said body of test fluid, connecting said body of test fluid with said closed zone after the flat ends of said specimen are sealed, whereby the peripheral surface of said specimen is placed in contact with the test fluid to cause said test fluid to radially flow into said specimen and the volume of the body of said second-named fluid is increased as the volume of the body of said test fluid is decreased, measuring the volume of test fluid which has entered said specimen at a plurality of instances during the period of flow, measuring the time interval between said instances, and from the measured quantities calculating the permeability of said specimen to said test fluid.

8. A method in accordance with claim 7 in which said test fluid is a gas.

9. A method in accordance with claim 7 in which said specimen is evacuated to remove substantially all gas therefrom and said test fluid is a liquid.

References Cited in the file of this patent

UNITED STATES PATENTS

| 1,046,263 | Calkins | Dec. 3, 1912 |
| 2,576,747 | Bryant | Nov. 27, 1951 |
| 2,659,433 | Brown | Nov. 17, 1953 |
| 2,662,393 | Rzasa | Dec. 15, 1953 |

FOREIGN PATENTS

| 309,308 | Germany | Dec. 6, 1916 |
| 504,119 | Canada | July 6, 1954 |